United States Patent
Swanepoel

Patent Number: 5,325,564
Date of Patent: Jul. 5, 1994

[54] WINDSCREEN WIPER BLADE WITH CURVED BACKING MEMBER

[76] Inventor: Adriaan R. Swanepoel, 309 Aries Street, Waterkloof Ridge, Pretoria, Transvaal Province, South Africa

[21] Appl. No.: 167,615

[22] Filed: Dec. 15, 1993

Related U.S. Application Data

[63] Continuation of Ser. No. 928,981, Aug. 12, 1992, abandoned.

[30] Foreign Application Priority Data

Aug. 16, 1991 [ZA] South Africa ............. 91/6473
Jan. 17, 1992 [ZA] South Africa ............. 92/0354

[51] Int. Cl.$^5$ ............................................. B60S 1/38
[52] U.S. Cl. ............................... 15/250.42; 15/250.36
[58] Field of Search ........... 15/250.42, 250.36, 250.20, 15/250.002, 250.41, 250.40, 250.37, 250.38, 250.39, 250.001; D12/155

[56] References Cited

U.S. PATENT DOCUMENTS

| | | | |
|---|---|---|---|
| 2,589,339 | 3/1952 | Carson | 15/250.36 |
| 3,029,460 | 4/1962 | Hoyler | 15/250.42 |
| 3,104,412 | 9/1963 | Hinder | 15/250.42 |
| 3,192,551 | 7/1965 | Appel | 15/250.42 |
| 3,480,986 | 12/1969 | Forster | 15/250.36 |
| 3,751,754 | 8/1973 | Quinlan et al. | 15/250.42 |
| 3,780,375 | 12/1973 | Quinlan et al. | 15/250.42 |
| 3,872,537 | 3/1975 | Bionchi | 15/250.36 |
| 3,881,214 | 5/1975 | Palu | 15/250.42 |
| 4,028,770 | 6/1977 | Appel | 15/250.42 |
| 4,063,328 | 12/1977 | Arman | 15/250.42 |
| 4,102,003 | 7/1978 | Hancu | 15/250.42 |
| 4,127,916 | 12/1978 | van den Berg et al. | 15/250.42 |
| 4,339,839 | 7/1982 | Knights | 15/250.36 |
| 4,343,063 | 8/1982 | Batt | 15/250.42 |
| 4,587,686 | 5/1986 | Thompson | 15/250.42 |
| 4,807,326 | 2/1989 | Arai et al. | 15/250.42 |

FOREIGN PATENT DOCUMENTS

| | | | |
|---|---|---|---|
| 2311293 | 9/1974 | Fed. Rep. of Germany | 15/250.42 |
| 2336271 | 2/1975 | Fed. Rep. of Germany | 15/250.42 |
| 2350302 | 4/1975 | Fed. Rep. of Germany | 15/250.42 |
| 2353368 | 5/1975 | Fed. Rep. of Germany | 15/250.42 |
| 2515121 | 4/1983 | France . | |
| 1012902 | 5/1963 | United Kingdom . | |
| 1395918 | 5/1975 | United Kingdom | 15/250.42 |

Primary Examiner—Timothy F. Simone
Assistant Examiner—Gary K. Graham
Attorney, Agent, or Firm—Cushman, Darby & Cushman

[57] ABSTRACT

A curved elongate backbone for a windscreen wiper has a loading profile that increases substantially from a central connector towards one or both ends of the backbone. The second differential of the bending moment also increases substantially from the connector towards the ends. The loading may increase right to the ends of the backbone or the backbone may have end portions with constant loading. In order to obtain the desired loading profile the width, thickness and free-form radius of curvature are suitably selected. In preferred embodiments, the backbone has a rectangular cross-sectional profile and the thickness and width decrease uniformly from the connector to the ends. However the thickness may also be constant for end portions.

16 Claims, 3 Drawing Sheets

WINDSCREEN WIPER BLADE WITH CURVED BACKING MEMBER

This is a continuation of application Ser. No. 07/928,981, filed on Aug. 12, 1992, which was abandoned upon the filing hereof.

BACKGROUND OF THE INVENTION

This invention relates to a windscreen wiper and more particularly to an elongate curved backbone for a windscreen wiper which is of a suitably resiliently flexible material.

SUMMARY OF THE INVENTION

According to the invention there is provided a windscreen wiper which includes an elongate curved backbone which is of a resiliently flexible material and which has a connecting formation at a position intermediate its length for connection to a displacing and force applying member, the backbone having a suitably varying transverse cross-sectional profile along its length and a suitable free-form curvature for the backbone to achieve, when it is pressed downwardly at the connecting formation onto a flat surface by a force sufficient to straighten the backbone, a force per unit length exerted perpendicularly to the surface which increases substantially from the position of the connecting formation towards at least one end of the backbone.

The backbone may be curved in a plane- the plane of curvature.

Further according to the invention there is provided a windscreen wiper which includes an elongate backbone which is curved in a plane, which is of a resiliently flexible material and which has a connecting formation at a position intermediate its length for connection to a displacing and force applying member, the backbone having a suitably varying cross-sectional profile along its length and a suitable free-form curvature, such that the second differential of the function $M(x)$ increases substantially from the said position towards at least one end of the backbone, where $$M(x) = \frac{E * I(x)}{R(x)}$$

with $E$ = modulus of elasticity $I(x)$ = cross-section moment of inertia of the backbone about a neutral axis transverse to the plane of curvature, at a distance x from the said position; and $R(x)$ = free-form radius of curvature of the backbone in the plane of curvature at x.

The wiper may include a wiper blade attached to the backbone and the sufficient force referred to above may be that force which causes the blade to contact the surface in a straight operative manner.

Persons skilled in the art will appreciate that the backbone will have a concave side and a convex side, the wider blade being attached to the concave side and the displacing and force applying member on the convex side.

The backbone may conveniently be of a metal such as spring steel and may be in the form of a single strip or may be in the form of a laminate.

The connecting formation may be centrally located or the wiper may be assymetric. The force per unit length may increase towards only one end of the backbone, but preferably it increases towards both ends of the backbone. Further, the force per unit length may increase towards both ends in a similar or dissimilar manner. Similarly, the second differential of $M(x)$ may increase substantially from the connecting formation towards only one end or towards both ends. If it increases towards both ends this may be in a substantially similar or dissimilar manner.

The force per unit length and the second differential of $M(x)$ may increase progressively towards the ends of the backbone until a short distance from each end and the backbone may then have two small portions at each end where the force per unit length and the second differential are a constant value. Further, the backbone may be such that in these small portions the force per unit length and the second differential are constant right to the tips of the backbone, or, at tip regions the backbone may be such that the force per unit length and the second differential decrease from the constant value to zero at the extremities of the backbone.

The force per unit length may increase, at least in the central region of the backbone, in an exponential manner. Conveniently, $$f(x) = A|x|^n + C$$

where $f(x)$ = force per unit length at a distance x from the connecting formation, A and C are determinable constants, and n is greater than unity.

Conveniently, n may be at least 3, is least 6 and is preferably about 10.

Those skilled in the art will appreciate that I (x) is determined by the transverse dimensions of the backbone at any position along its length. In most cases, the backbone will have a regular cross-sectional profile which may, for example be rectangular or ellipsoidal. Thus, in most instances, the backbone will have a width and a thickness. It will be understood that the width dimension will be that dimension which extends perpendicularly to the plane of curvature and the thickness will be the dimension which lies in the plane of curvature.

The thickness of the backbone may decrease from the connecting formation towards both ends until a predetermined distance from the ends, with the thickness being constant along these end portions. These end portions may have a length of at least 20 mm.

It can be shown, that with a backbone which has a rectilinear cross-section at all positions along its length, that $$M(x) = \frac{E * b_x * h_x^3}{12 * R_x}$$

where $b_x$ equals the width at distance x, $h_x$ equals thickness at distance x.

Thus, with a backbone having a rectangular cross-section, the width and thickness may vary in a predetermined manner and the radius of curvature may then be varied so that $M(x)$, and mrs second differential vary in the desired manner.

If the backbone has an elliptical cross-section then it can be shown that $$M(x) = \frac{\pi * E * b_x * h_x^3}{64 * R_x}$$

If the backbone has any other cross-sectional profile the equation for M(x) may be determined utilising conventional mathematical techniques.

Those skilled in the art will appreciate that there is a relationship between the second differential of M(x) and the force per unit length. Thus, the second differential of M(x) may vary in the same manner as that described above for the force per unit length.

It will be appreciated further that the width, thickness and radius of curvature also determine other characteristics of the backbone. Thus, the radius of curvature of the backbone will determine the extent of curvature of a windscreen that can be cleaned by the wiper. Thus, if the windscreen, in any particular region, has a greater curvature than that portion of the wiper that is to pass thereover, then the wiper will not clean that region of the windscreen in an effective manner.

Similarly, the width and thickness will determine the rigidity of the wiper and if the backbone is too thin at its tips it will be vulnerable to mechanical damage.

Those skilled in the art will also appreciate that M(x) is the bending moment of the backbone.

Further, if a curved beam is uniformly loaded, i.e. the force per unit length is a constant along the length of the beam when it is pressed down onto a flat surface, then the bending moment is $$M_c(x) = \frac{F * (4x^2 - 4Lx + L^2)}{8 * L}$$

where
F = the total force applied to the beam to straighten it against a flat surface, and
L = the length of the beam.

Thus, with a rectangular backbone if $$\frac{b_x * h_x^3}{R_x} > \frac{12 * F * (4x^2 - 4Lx + L^2)}{8 * L * E}$$

at all positions along at least a part of the backbone (which is a substantial part), then the backbone will be such that the force per unit length increases along the length of this part of the backbone away from the connecting formation.

Similarly, with an elliptical cross-section, the backbone will have an increasing force per unit length if $$\frac{b_x * h_x^3}{R_x} > \frac{8 * F * (4x^2 - 4Lx + L^2)}{\pi * E * L}$$

For practical reasons, the backbone should have end with a constant radius of curvature, and the tips themselves are preferably straight.

DETAILED DESCRIPTION OF THE PREFERRED EMBODIMENT

The invention is now described by way of example only with reference to the drawings.

Figure 1:
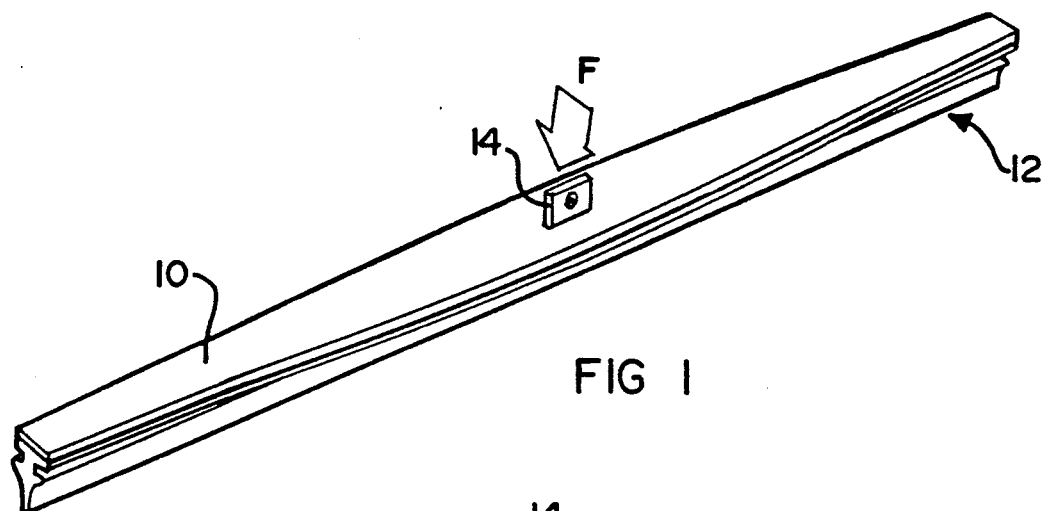
FIG. 1 is a perspective view from above of the windscreen wiper of the invention with the drawing being shortened for clarity of illustration.
Figure 2:
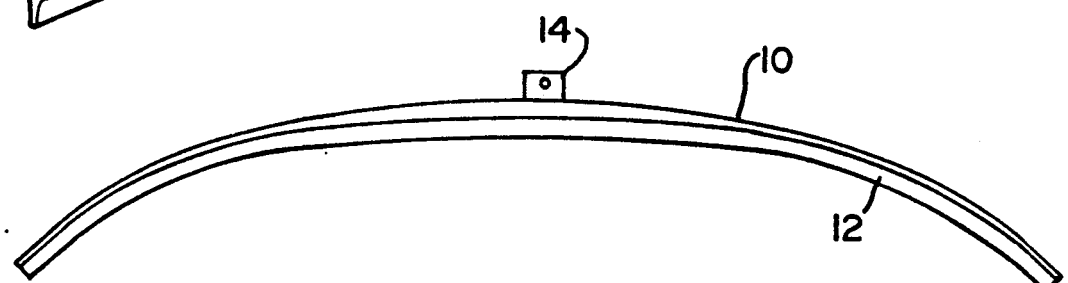
FIG. 2 is a side elevation of the FIG. 1 windscreen wiper shown in an unloaded free form condition.
Figure 3:
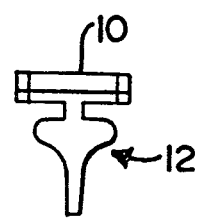
FIG. 3 is an end elevation of the wiper.

The windscreen wiper of the invention is shown in FIGS. 1 to 3 to include a spring backbone 10 and a wiper blade 12. The backbone 10 has a centrally located connector 14 for releasably connecting the wiper to a spring loaded wiper arm (not shown). The connector 14 could be of any suitable type. The backbone 10 has suitable attachment formations (also not shown) to ensure that the blade 72 is securely attached to the backbone 10.

The spring backbone of the wiper is preferably made from spring steel and tapers both in width and thickness from its centre towards its free ends or tips. The backbone is pre-curved longitudinally with a predetermined radius of curvature at every point in its length. The backbone 10 defines a plane, which is defined by the sheet of paper in FIG. 2. The cross section of the backbone is preferably rectangular but may be of any other suitable shape. Most importantly to the invention the thickness and width of the backbone 10 and its radius of curvature are matched at every point along the length of the backbone so that the backbone will provide a force per unit length distribution in a longitudinal direction which increases towards both tips of the windscreen wiper when the windscreen wiper is, in use, pressed downward intermediate its ends onto a flat surface, as shown in FIG. 1, by a force F which is equal in magnitude to the down force required to straighten the backbone. By straighten is meant that the force F must be adequate to render the wiper blade 12 fully functional.

Figure 4:
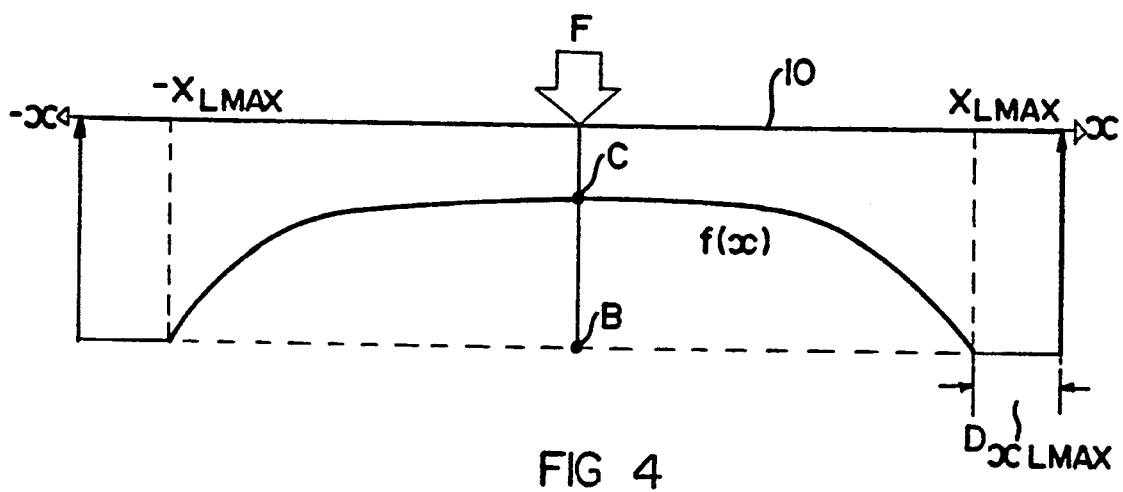
FIG. 4 is a force distribution diagram illustrating the lengthwise distribution of the force per unit length on the windscreen wiper of FIGS. 1 to 3 when it is pressed against a flat surface in an operational manner.

A suitable force per unit length distribution is shown in FIG. 4, where the various parameters have the following meaning:

F = downforce applied to wiper by wiper arm.
f(x) = force per unit length distribution between $-XL_{LMAX}$ and $X_{LMAX}$ in N/m.
B = Maximum loading acceptable at tips, in N/m.
$X_{LMAX}$ = point where maximum loading starts.
$D_{XLMAX}$ = distance from tip for which the maximum loading B applies
L = length of wiper blade.

In this example, the following values are assumed
F = 6,975N
L = 0.45 m
$D_{XLMAX}$ = 0.02 m, therefor $X_{LMAX}$ = 0,205 m
B = 34.1N/M It will be appreciated that the distribution between $-X_{LMAX}$ and $+X_{LMAX}$ is of the form $$f(x) = A|x|^n + C \qquad (1)$$

where n = 10.

The co-efficient A in equation (1) is determined from the formula $$A = \frac{(n+1)[F - 2Cx_{LMAX} - 2B\,D_{XLMAX}]}{2X_{LMAX}^{n+1}} \qquad (2)$$

Equation (2) represents a situation where the force distribution balances the total force F. As indicated in the broad description above, the distribution at the ends of the backbone is a constant (B). Further, as indicated above, the loading may decrease right at the tips, although this is not shown in FIG. 4.

To achieve the increasing loading (as discussed above) the thickness of the spring backbone at any position in its length must subscribe to the following equation:

$$h(x) > \left[ \frac{3R_x F(4x^2 - 4Lx + L^2)}{2LEb_x} \right]^{\frac{1}{3}}$$

The above equation relates to a wiper backbone which has a substantially rectangular cross sectional shape. In further experimentation with the wiper backbone of the invention it may, however, as mentioned above, be found that cross sectional shades other than rectangular may provide the backbone with better structural characteristics than does the rectangular backbone. In this event, the equation will need to be adapted to suit the particular shape required. For example, in a backbone having an elliptical cross section the equation will need to be adjusted as follows:

$$h(x) > \left[ \frac{8R_x F(4x^2 - 4Lx + L^2)}{\pi LEb_x} \right]^{\frac{1}{3}}$$

The wiper blade 12 is made from a suitable rubber or elastomeric material and in the currently preferred embodiment of the invention is shaped in cross section as illustrated in FIG. 3. The cross sectional shape of the blade 12 may, however, if required, be made variable at various positions in its length.

EXAMPLE 1

A wiper backbone, which is of spring steel and has a rectangular cross-sectional profile and which has the required loading increase towards its tips, torsional rigidity and wrap around capability has the following dimensional values:

| | |
|---|---|
| modulus of elasticity | $207 \times 10^9$ N/m$^2$ |
| length | 450 mm |
| thickness at the centre of the backbone | 1.29 mm |
| thickness at the tips | 0.22 mm |
| width at the centre | 11 mm |
| width at the tips | 6 mm |

The backbone tapers uniformly in both thickness and width in a straight line manner from its centre to its tips.

As has been mentioned above it is essential to this invention that the reactive loading on the wiper backbone when pressed onto a flat surface, as illustrated in FIG. 4, must increase towards the tips of the backbone as shown in the drawing.

The curvature required to give this loading profile is determined in the following way.

Using equation (1) above, the parameter C in FIG. 4 is calculated iteratively until $f(x) = B$ at the point $$x = X_{LMAX}$$

In this example, C = 11.63 N/m.

With C known, A can now be determined from equation (2). The value of A is approximately 171,300,000 N/m$^{11}$.

From basic Strengths of Material theory, the bending moment equation where $L/2 > |x| > X_{LMAX}$ is $$M(x) = \tfrac{1}{2}B[X^2 - L|x| + L^2/4] \qquad (3)$$

By derivation from Standard Strengths of Material theory, the bending moment equation where $X < X_{LMAX}$ is $$m(X) = A\left( \frac{1}{n+1} - \frac{1}{n+2} \right)X^{n+2} + \frac{C}{2}x^2 - \qquad (4)$$

$$\left( \frac{AY^{n+1}}{n+1} + CY \right)x + \left( \frac{CY^2}{2} + \frac{AY^{n+2}}{n+2} \right) +$$

$$\frac{B}{2}\left( Y(2x - Y) - Lx + \frac{L^2}{4} \right)$$

where $Y = X_{LMAX}$

At any point x along the length of the backbone, the radius of curvature R is given by $$R(x) = \frac{EI(x)}{M(x)} \qquad (5)$$

where

I(x) = cross section moment of inertia at position x,
E = modulus of elasticity (Young's modulus)
M(x) = is given by either equation (3) or (4), depending on the value of x.

Figure 6:
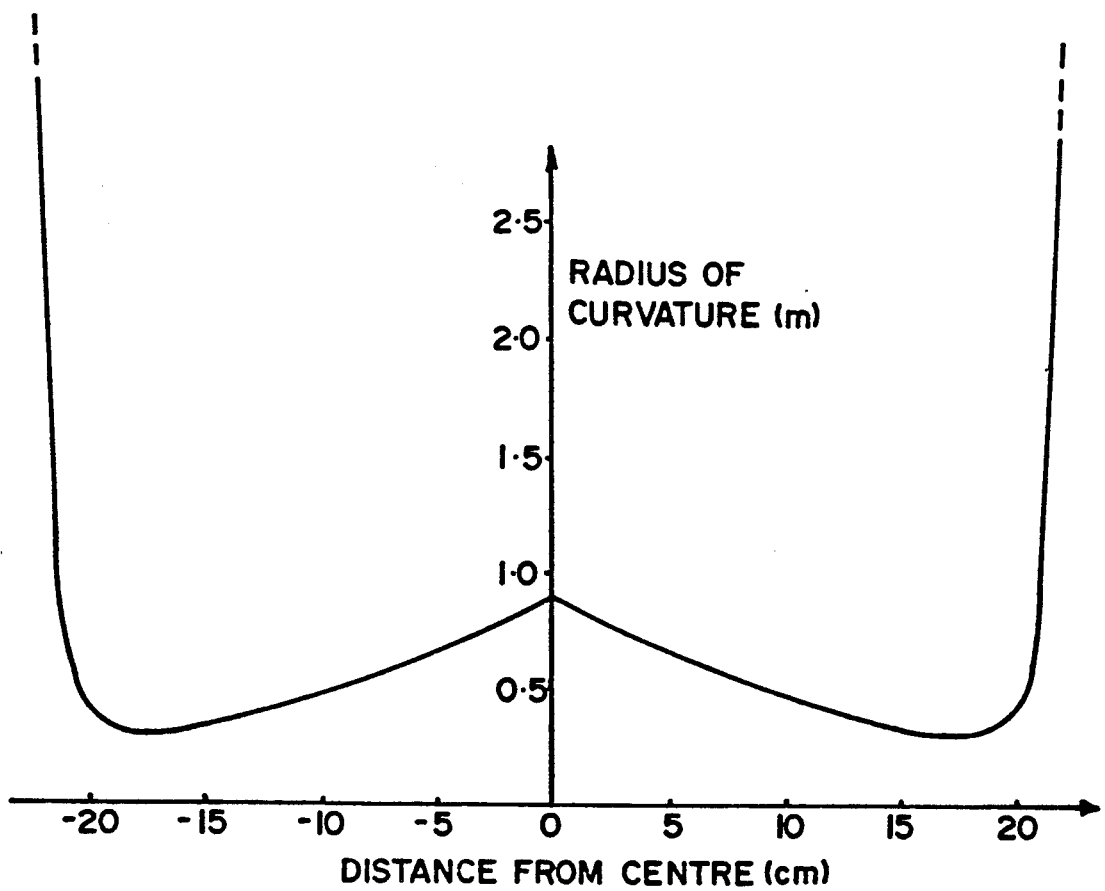
FIG. 6 shows graphically the variation in the radius of curvature of the wiper of FIGS. 1 and 2 in its free form condition.

Using equation (5) the radius of curvature as shown in FIG. 6 is determined.

Figure 5:
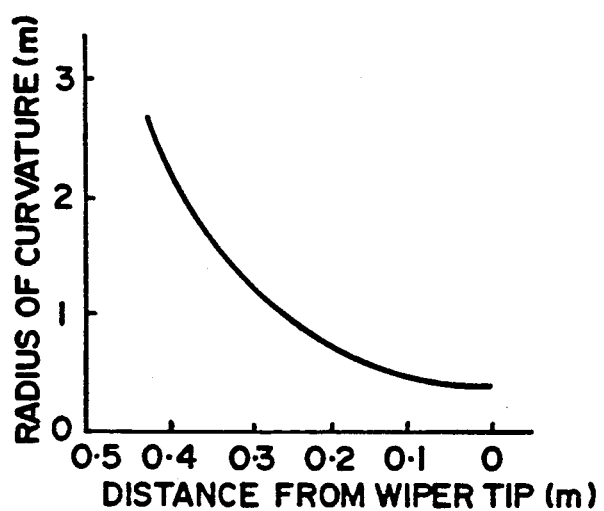
FIG. 5 illustrates the curvature requirement to which a wiper blade should conform to operate satisfactorily on a typically curved motor vehicle windscreen.

At all points x (except for the last 45 mm at the tips) the example backbone satisfies the curvature requirements represented by FIG. 5, i.e. R(x) according to equation (5) is smaller than the required radius of curvature.

EXAMPLE 2

The example described above is of a wiper having a rectangular backbone which tapers uniformly in both thickness and width in a straight line manner from its centre to its tips. As indicated above, the backbone could have tip portions of constant thickness. The dimensions and other values for such a backbone in accordance with the invention are

| | |
|---|---|
| F = | 6,3 N |
| L = | 44 cms |
| $D_{XLMAX}$ = | 3 cms, therefore |
| $X_{LMAX}$ = | 19 cms |

-continued

| | |
|---|---|
| B = | 20 N/m |
| n = | 10 |
| modulus of elasticity = | 207 × 10⁹ N/m² |
| length = | 440 mm |
| thickness at the centre of the backbone = | 1.15 mm |
| thickness at the tip portions = | 0.43 mm |
| distance from the tips for which thickness remains constant = | 45 mm |
| width at centre = | 11 mm |
| width at the tips = | 6 mm. |

Thus, the backbone tapers uniformly in width from its centre to its tips and uniformly in thickness from its centre to 175 mm from the centre, then the thickness remains constant for the next 45 mm right to the tips.

These parameters produce the following results
C = 12.85 N/m
A = 102,000,000 N/m$^{11}$ (approximately).

Using these values in equations (3), (4) and (5) above, the following radius of curvature are obtained

| X (cm) | Radius of Curvature (m) |
|---|---|
| 0 | 0,766 |
| 2 | 0,704 |
| 4 | 0,643 |
| 6 | 0,586 |
| 8 | 0,535 |
| 10 | 0,490 |
| 12 | 0,454 |
| 14 | 0,430 |
| 16 | 0,433 |
| 18 | 0,568 |
| 20 | 2 |
| 22 | 826 |

Figure 7:
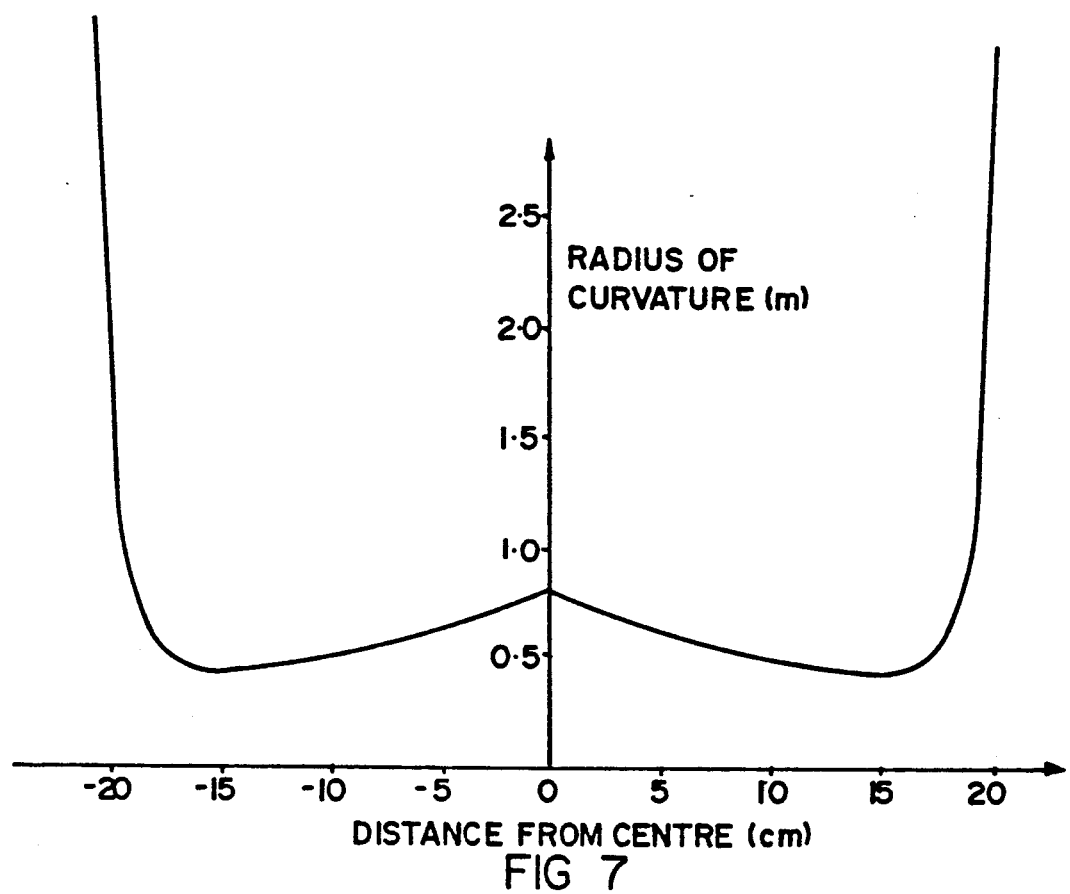
FIG. 7 shows graphically the variation in the radius of curvature of a further embodiment of a wiper which has a symmetrical backbone with tip portions of constant thickness.

The radius of curvature of such a wiper is shown graphically in FIG. 7.

EXAMPLE 3

Further, as indicated above a rectangular backbone could be assymmetric, having a connector that is not centrally located, and the loading is different towards both ends. The dimensions of, and other values for, such a backbone in accordance with the invention are
F = 6.3N
L = 45 cms.

The connection point is shifted 13 mm longitudinally from the geometric centre, to one side of the backbone. The shorter side of the backbone is therefore 212 mm long and the longer side is 238 mm long.

Dealing firstly with the shorter side. The total force applied to the shorter side of the beam is 3.2N, therefore for a notional symmetric backbone $F = 2*3.2N = 6.4N$ The length of the shorter side is 212 mm, therefore for a notional symmetric backbone

| | |
|---|---|
| L = | 2 * 212 mm = 424 mm |
| D$_{XLMAX}$ = | 3 cms, therefore |
| X$_{LMAX}$ = | 18.2 cms |
| B = | 22 N/m |
| n = | 10 |
| modulus of elasticity = | 207 * 10⁹ N/m² |
| thickness at connector = | 1.15 mm |
| thickness at tips = | 0.43 mm |
| distance from the tips for which thickness remains the same = | 45 mm |
| width at connector = | 11 mm |
| width at the tips = | 6 mm. |

Thus the shorter side of the backbone has a width that decreases uniformly to the tip and a thickness that decreases uniformly for a distance of 167 mm from the connector and which then remains constant for the remaining 45 mm right to the tip.

These parameters produce the following results for the short side of the blade
C = 13.1 N/m
A = 236,000,000 N/m$^{11}$ (approximately).

Using these above values in equations (3), (4) and (5) above, the following radii of curvature result

| X (cm) | Radius of Curvature (m) |
|---|---|
| 0 | 0,778 |
| 2 | 0,709 |
| 4 | 0,641 |
| 6 | 0,579 |
| 8 | 0,522 |
| 10 | 0,472 |
| 12 | 0,433 |
| 14 | 0,408 |
| 16 | 0,416 |
| 18 | 0,777 |
| 20 | 4,657. |

Dealing now with the longer side of the backbone

The total force applied to the longer side of the backbone is 3,1N, therefore for a notional symmetric backbone $F = 2*3.1N = 6.2N$ The length of the longer side is 238 mm therefore for a notional symmetric backbone

| | |
|---|---|
| L = | 2 * 238 mm = 476 mm |
| D$_{XLMAX}$ = | 0, therefore |
| X$_{LMAX}$ = | 238 mm |
| B = | 13.1 N/m |
| n = | 10 |
| thickness at connector = | 1.15 mm |
| thickness at tips = | 0.40 mm |
| distance from the tips for which thickness remains the same = | 45 mm |
| width at connector = | 11 mm |
| width at the tips = | 6 mm. |

Thus the longer side of the backbone has a width that decreases uniformly to the tip and a thickness that decreases uniformly from the connector for a distance of 193 mm and then remains constant for the next 45 mm right to the tip.

With this example, the longer side has uniform loading and thus, these parameters produce, for the longer side,
C = 13.1 N/m
A = 0 N/m$^{11}$; and Using the above values, as before, the following radii of curvature are obtained.

| X (cm) | Radius of Curvature (m) |
|---|---|
| 0 | 0,779 |
| 2 | 0,727 |
| 4 | 0,675 |
| 6 | 0,627 |

-continued

| X (cm) | Radius of Curvature (m) |
| --- | --- |
| 8 | 0,584 |
| 10 | 0,546 |
| 12 | 0,515 |
| 14 | 0,493 |
| 16 | 0,488 |
| 18 | 0,515 |
| 20 | 0,757 |
| 22 | 2.993. |

Figure 8:
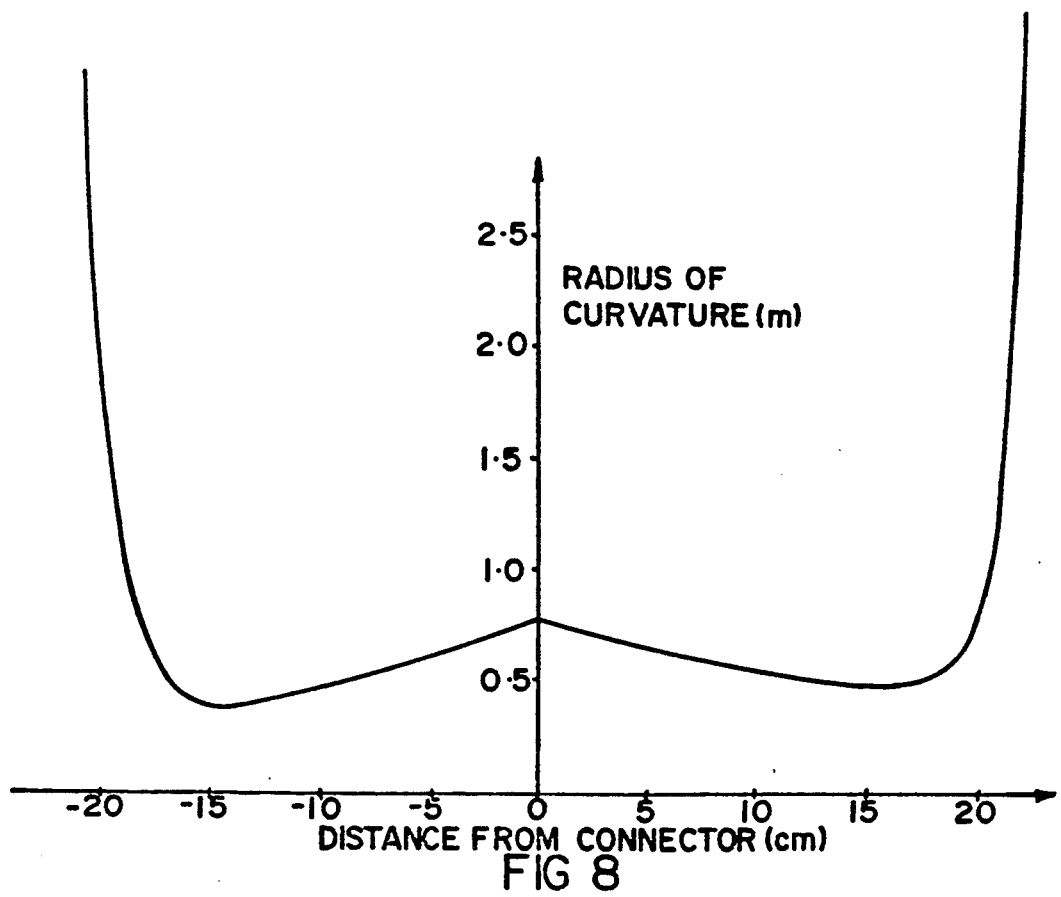
FIG. 8 shows graphically the variation in the radius of curvature of a still further embodiment of a wiper which has an assymetric backbone with tip portions of constant thickness.

The radius of curvature of such a wiper is shown graphically in FIG. 8.

It will be noted that, with the first two examples, between $-X_{LMAX}$ and $X_{LMAX}$, the force per unit length exerted perpendicularly when the backbone is straightened increases substantially from the middle towards the ends; the second differential of M(x) also increases substantially; and $$\frac{b_x * h_x^3}{R_x} > \frac{12 * F * (4x^2 - 4Lx + L^2)}{8 * L * E}$$

all positions. This is also the case with the shorter side of the third example.

The invention is not limited to the precise details as herein described. For example it is not essential that the backbone of the wiper tapers uniformly from the centre down towards the tips and in some applications the load distribution of the blade on the glass of a specific windshield may need to increase only towards one tip of the wiper. Additionally, as indicated above, to achieve a constant angle of wipe of the blade 12 along its length it may be necessary to shed the distributed blade load at the tip portions of the wiper.

I claim:

1. A windscreen wiper assembly comprising:
    an elongated wiper blade having first and second longitudinal ends, a wiper edge defined along the length thereof from said first longitudinal end to said second longitudinal end, and a substantially flat mounting face defined along the length thereof from the first longitudinal end to the second longitudinal end and opposed to said wiper edge; and
    an elongate, curved, one-piece backbone having first and second longitudinal ends and a substantially flat mounting surface defined along the length thereof from said first longitudinal end to said second longitudinal end, said backbone having a cross-sectional profile defining a thickness and a width thereof, said backbone being secured to said wiper blade so that said mounting surface is in opposed facing relation to and in substantially continuous contact with said mounting face of said wiper blade, said curved backbone being substantially coextensive with said wiper blade, said backbone being formed from a resiliently flexible material and having a connecting formation projecting from a position intermediate said first and second longitudinal ends, the thickness of said backbone being greater at said position, said connecting formation providing a means for connection to a displacing and force applying member;
    the thickness of said backbone gradually decreasing along at least a first portion of said backbone, which is defined between said position and said first longitudinal end;
    the backbone being curved in a plane, and the backbone having a cross-sectional profile and a free-form curvature which vary along its length, and wherein the second differential of the function M(x) increases along said first portion towards said first longitudinal end, where $$M(x) = \frac{E * I(x)}{R(x)}$$

with 'E = the modulus of elasticity of the backbone;
I(x) = the cross-section moment of inertia of the backbone about a neutral axis at a distance x from said position transverse to the plane of curvature; and
R(x) = the free-form radius of curvature of the backbone in the plane of curvature at x.

2. A windscreen wiper as in claim 1, wherein the connections formation is provided and said thickness is greatest, midway between the ends of said backbone.

3. A windscreen wiper as in claim 1, wherein at least one of the thickness and the width of the backbone also gradually decrease along said backbone from said position to said second longitudinal end.

4. A windscreen wiper as in claim 1, wherein the width of the backbone is greatest at said position and the width of said backbone gradually decreases along at least said first portion of said backbone.

5. A windscreen wiper assembly comprising:
    an elongated wiper blade having first and second longitudinal ends, a wiper edge defined along the length thereof from said first longitudinal end to said second longitudinal end, and a substantially flat mounting face defined along the length thereof from the first longitudinal end to the second longitudinal end and opposed to said wiper edge; and
    an elongate, curved backbone having first and second longitudinal ends and a substantially flat mounting surface defined along the length thereof from said first longitudinal end to said second longitudinal end, said backbone being secured to said wiper blade so that said mounting surface is in opposed facing relation to said mounting face of said wiper blade, said curved backbone being substantially coextensive with said wiper blade, said backbone having a generally rectangular cross-sectional profile along at least a substantial portion of the length thereof, said backbone being formed from a resiliently flexible material and having a connecting formation projecting from a position intermediate said first and second longitudinal ends, said connecting formation providing a means for connection to a displacing and force applying member;
    at least one of a thickness of said backbone and a width of said backbone gradually decreasing along at least a first portion of said backbone, which is defined between said position and said first longitudinal end;
    the backbone being curved in a plane, and the backbone having a cross-sectional profile and a free-form curvature which vary along its length, and wherein the second differential of the function M(x) increases along said first portion towards said first longitudinal end, where $$M(x) = \frac{E * I(x)}{R(x)}$$

with

E = the modulus of elasticity of the backbone;

I(x) = the cross-section moment of inertia of the backbone about a neutral axis at a distance x from said position transverse to the plane of curvature; and R(x) = the free-form radius of curvature of the backbone in the plane of curvature at x.

6. A windscreen wiper as in any one of claims 1-5, wherein when the backbone is pressed downwardly at the connecting formation onto a flat surface by said force applying member with a force sufficient to straighten the backbone, the force per unit length exerted perpendicularly to the surface increases progressively along said first portion.

7. A windscreen wiper as in any one of claims 1-5, wherein said first portion extends from said position substantially to said first end.

8. A windscreen wiper assembly comprising:

an elongated wiper blade having first and second longitudinal ends, a wiper edge defined along the length thereof from said first longitudinal end to said second longitudinal end, and a substantially flat mounting face defined along the length thereof from the first longitudinal end to the second longitudinal end and opposed to said wiper edge; and an elongate, curved backbone having first and second longitudinal ends and a substantially flat mounting surface defined along the length thereof from said first longitudinal end to said second longitudinal end, said backbone having a cross-sectional profile defining a thickness and a width thereof, said backbone being secured to said wiper blade so that said mounting surface is in opposed facing relation to said mounting face of said wiper blade, said curved backbone being substantially coextensive with said wiper blade, said backbone being formed from a resiliently flexible material and having a connecting formation projecting from a position intermediate said first and second longitudinal ends, said connecting formation providing a means for connection to a displacing and force applying member;

the thickness of said backbone gradually decreasing along at least a portion of said backbone between said position and a point spaced from said first longitudinal end, the thickness remaining constant from that point to the first longitudinal end;

the backbone being curved in a plane, and the backbone having a cross-sectional profile and a free-form curvature which vary along its length, and wherein the second differential of the function M(x) increases along said portion towards said point, where $$M(x) = \frac{E * I(x)}{R(x)}$$

with 'E = the modulus of elasticity of the backbone;

I(x) = the cross-section moment of inertia of the backbone about a neutral axis at a distance x from said position transverse to the plane of curvature; and R(x) = the free-form radius of curvature of the backbone in the plane of curvature at x.

9. The wiper claimed in claim 8, in which the distance from said point to said first longitudinal end is at least 20 mm.

10. A windscreen wiper as in claim 8, wherein the width of said backbone gradually decreases along said backbone, from said position to said first longitudinal end.

11. A windscreen wiper as in claim 8, wherein when the backbone is pressed downwardly at the connecting formation onto a flat surface by said force applying member with a force sufficient to straighten the backbone, the force per unit length exerted perpendicularly to the surface increases along said backbone from said position at least to said point.

12. A windscreen wiper as in claim 8, wherein said portion extends from said position to said point.

13. The wiper claimed in any one of claims 1, 5, 8, in which $$M''(X) = A|X|^n + C$$

where M''(x) is the second differential of M(x); A and C are determinable constants; and n is greater than unity.

14. A windscreen wiper as in any one of claims 1, 5, 8, wherein the backbone has a rectangular transverse cross-sectional profile along a substantial part of its length and in which, at all positions along said part $$\frac{b_x * h_x^3}{R_x} > \frac{24}{E} (4x^2 - 4Lx + L^2)$$

where $b_x$ = width at distance x from said position;

$h_x$ = thickness at x;

$R_x$ = free-form radius of curvature of the backbone in the plane at x;

L = the length of said backbone; and

E = modulus of elasticity.

15. A windscreen wiper as in any one of claims 1, 5, 8 wherein said backbone has a substantially closed transverse cross-section.

16. A windscreen wiper as in claim 15, wherein said backbone has a cross-sectional profile which is symmetrical with respect to a surface that includes said longitudinal axis and said width of said backbone.

* * * * *

UNITED STATES PATENT AND TRADEMARK OFFICE
CERTIFICATE OF CORRECTION

PATENT NO. : 5,325,564
DATED : July 5, 1994
INVENTOR(S) : SWANEPOEL

It is certified that error appears in the above-indentified patent and that said Letters Patent is hereby corrected as shown below:

In Column 2, line 32, insert --generally at-- after "is";
line 65, "mrs" should be --its--.
In Column 3, lines 57, insert --portions-- before "with".
In Column 4, line 29, "72" should be --12--.
In Column 5, line 32, "shades" should be --shapes--.
line 40, the exponent "1/2" should be --1/3--.
In Column 8, line 29, "Dealing now with the longest side of the backbone" should be in normal size print.
In Column 9, line 24, insert --at-- before "all".

Signed and Sealed this

Third Day of January, 1995

BRUCE LEHMAN

Attest:

Attesting Officer

Commissioner of Patents and Trademarks